United States Patent
Kawakami et al.

(10) Patent No.: US 8,550,730 B2
(45) Date of Patent: Oct. 8, 2013

(54) FOCAL PLANE SHUTTER FOR CAMERAS

(71) Applicant: Nidec Copal Corporation, Tokyo (JP)

(72) Inventors: Kenta Kawakami, Tokyo (JP); Shigemi Takahashi, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 13/690,403

(22) Filed: Nov. 30, 2012

(65) Prior Publication Data

US 2013/0136443 A1    May 30, 2013

(30) Foreign Application Priority Data

Nov. 30, 2011   (JP) .................................. 2011-261678

(51) Int. Cl.
*G03B 9/08*     (2006.01)
(52) U.S. Cl.
USPC .......................................... 396/470; 396/456
(58) Field of Classification Search
USPC .................................. 396/456, 470; 335/250
See application file for complete search history.

(56) References Cited

U.S. PATENT DOCUMENTS

| 6,726,379 B2 * | 4/2004 | Watabe et al. ................. 396/456 |
| 6,899,473 B2 * | 5/2005 | Kudo et al. ..................... 396/484 |
| 2012/0087646 A1 * | 4/2012 | Takahashi et al. ............ 396/470 |

FOREIGN PATENT DOCUMENTS

JP          2003-66507          3/2003

* cited by examiner

*Primary Examiner* — Clayton E LaBalle
*Assistant Examiner* — Dennis Hancock
(74) *Attorney, Agent, or Firm* — Wenderoth, Lind & Ponack, L.L.P.

(57) ABSTRACT

In a focal plane shutter according to the present invention, a support plate is placed while a plate plane of the support plate is parallel to a shutter base plate, a second blade-driving member is fitted to a shaft erectly provided on the shutter base plate, the second blade-driving member being rotated by the biasing force of a second blade-driving spring, an electromagnet for second blade is fitted to the support plate, the electromagnet attracting and holding an iron piece member fitted to the second blade-driving member, a printed wiring board on which a wiring pattern for supplying electric current to the electromagnet is formed is placed in a hole formed in the support plate, and terminal pins of the electromagnet are soldered to the both ends of a coil.

2 Claims, 4 Drawing Sheets

FOCAL PLANE SHUTTER FOR CAMERAS

BACKGROUND OF THE INVENTION

1. Field of the Invention

The present invention relates to a focal plane shutter for cameras which is used for single-lens reflex cameras, mirrorless single-lens cameras, or the like.

2. Description of Related Art

Focal plane shutters for cameras include: a focal plane shutter which is provided with only a single shutter blade; and a focal plane shutter which is provided with two shutter blades called a first blade and a second blade respectively. And, the focal plane shutter including only a single shutter blade is usually formed as a focal plane shutter in which shooting is started with an exposure aperture fully opened and shooting is finished by closing the exposure aperture through the shutter blade. Also, the focal plane shutter including two shutter blades is usually formed as a focal plane shutter in which shooting is started by starting to open an exposure aperture through the first blade and shooting is finished by completely closing the exposure aperture through the second blade. However, it is known that there is also a focal plane shutter including two shutter blades which is formed as a focal plane shutter in which, as often as shooting is performed, a user can choose between: shooting performed in such a manner; and shooting that is started with an exposure aperture fully opened and is finished by closing the exposure aperture through the second blade.

In each of these focal plane shutters, a shutter blade runs by a rotation of a driving member, and a helical torsion coil spring (which is called "driving spring" below) is usually used as a driving source for driving the driving member in shooting. As a result, when shooting is finished, the driving member has to be rotated to its cocking position against the biasing force of the driving spring, and, just before next shooting is started, the driving member has to be kept in its shooting-operation-starting position against the biasing force of the driving spring. And, there are structures which are called locking-type structure and direct-type structure respectively as a structure for keeping the driving member in such a position. Japanese Patent KOKAI No. 2003-66507 discloses a direct-type focal plane shutter which is provided with two shutter blades.

As described also in Japanese Patent KOKAI No. 2003-66507, a conventional direct-type focal plane shutter is formed in such a way that: an electromagnet is fitted to the shutter-base-plate side plane of a support plate which is placed with the plate planes of the support plate parallel to a shutter base plate; and a printed wiring board is fitted on the other side plane of the support plate. And, the printed wiring board not only is provided with a wiring pattern but also is equipped with a condenser, as disclosed in Japanese Patent KOKAI No. 2002-139770 for example but not disclosed in Japanese Patent KOKAI No. 2003-66507. Also, as known publically, the electromagnet is provided with two terminal pins around which the both ends of a coil are wounded respectively, the two terminal pins penetrate through holes provided on the printed wiring board, and the both ends of the coil are soldered to the wiring pattern of the printed wiring board.

On the other hand, as described in Japanese Patent KOKAI No. 2003-66507, the driving member includes an iron piece member, and the driving member is rotatably fitted to a shutter base plate between the shutter base plate and the support plate. And, just before shooting is started, the electromagnet attracts and holds the iron piece member, so that the driving member is kept in its shooting-operation-starting position against the biasing force of the driving spring. Afterward, the driving member is rotated by the biasing force of the driving spring by demagnetizing the electromagnet. The present invention relates to a direct-type focal plane shutter in which such a conventional structure is improved and which includes at least one shutter blade.

Recently, the appearance of mirrorless single-lens cameras accelerates downsizing of single-lens cameras also including single-lens reflex cameras. As a result, a demand to downsize or to thin the whole of a unit with respect to focal plane shutters built into these cameras has been grown more than ever. However, the focal plane shutters have been downsized or made to have a compact size to a considerable extent up to now, so that it has become very difficult to downsize each of components of the focal plane shutters, and an effort to downsize these components in the order of 0.1 mm or less has been actually made.

Now, most of components except shutter blades are intensively fitted to a predetermined area located on the lateral side of an opening for the optical path of light from an object in the shutter base plate in the units of focal plane shutters, as known publically. As a result, the height of shutter unit from a plane of the shutter base plate becomes extremely high only on that area. Accordingly, in the case where the unit is downsized, the height of shutter unit from a plane of the shutter base plate on that area to which these components is intensively fitted has to be lowered somehow or other, first of all. However, downsizing of each of components for focal plane shutters has been performed up to now as described above, so that another ingenuity for downsizing in the view of structures of focal plane shutters is needed.

The present invention is made in order to solve such a problem. The objective of the present invention is to offer a focal plane shutter for cameras: in which the height of shutter unit from a plate plane of a shutter base plate is lowered by improving such a conventional structure as an electromagnet is fitted on the shutter-base-plate side plane of a support plate and a printed wiring board is fitted on the other side plane of the support plate, the support plate being provided while a plate plane of the support plate is parallel to the shutter base plate; and which includes at least one shutter blade.

SUMMARY OF THE INVENTION

In order to achieve the above described objective, a focal plane shutter for cameras according to the present invention is formed in such a way that the focal plane shutter includes: a support plate which has a missing portion and is placed while a plate plane of the support plate is parallel to a shutter base plate; a driving member which is rotatably fitted to a shaft erectly provided on the shutter base plate, between the shutter base plate and the support plate, and which is rotated by biasing force of a driving spring from its shooting-operation-starting position in shooting to run a shutter blade; an electromagnet which includes a coil wounded around a bobbin, the both ends of the coil being wound around two terminal pins that are provided for the bobbin and are inserted into the missing portion, respectively, and an iron core member magnetized by electrifying the coil, which is fitted on the support plate with the electromagnet between the shutter base plate and the support plate, and which attracts and holds the driving member by magnetization of the iron core member in shooting and then releases the driving member to make it possible to rotate the driving member from its shooting-operation-starting position by demagnetization of the iron core member after a predetermined lapse of time; and a printed wiring board which is placed in the missing portion and is soldered to the both ends of the coil.

Also, a focal plane shutter for cameras according to the present invention may be formed in such a way that: the focal plane shutter is provided with two driving members, two electromagnets, and two printed wiring boards; the support plate is provided with two missing portions; and the two printed wiring boards are electrically connected to each other.

As described above, according to a focal plane shutter for cameras of the present invention, the printed wiring board is not put on a plate plane of the support plate unlike the conventional manner, but the printed wiring board is placed only in the missing portion like a through hole which is formed in the support plate. As a result, the present invention makes it possible to lower the height of shutter unit from a plate plane of the shutter base plate by the thickness of the printed wiring board in the case where the support plate is thicker than the printed wiring board or by the thickness of the support plate in the case where the printed wiring board is thicker than the support plate.

These and other features and advantages of the present invention will become apparent from the following detailed description of the preferred embodiments when taken in conjunction with the accompanying drawings.

DETAILED DESCRIPTION OF THE PREFERRED EMBODIMENTS

Embodiment 1

An embodiment according to the present invention is explained using FIGS. 1 to 4. Besides, the present embodiment is made by applying the present invention to a focal plane shutter including two shutter blades. In addition, it is also possible to apply the present invention to a focal plane shutter including a single shutter blade. However, there is specially no necessity to explain and illustrate the aspect of the focal plane shutter including a single shutter blade as another embodiment. Accordingly, only matters necessary for the focal plane shutter including a single shutter blade are explained in the following explanation about the present embodiment.

Figure 1:
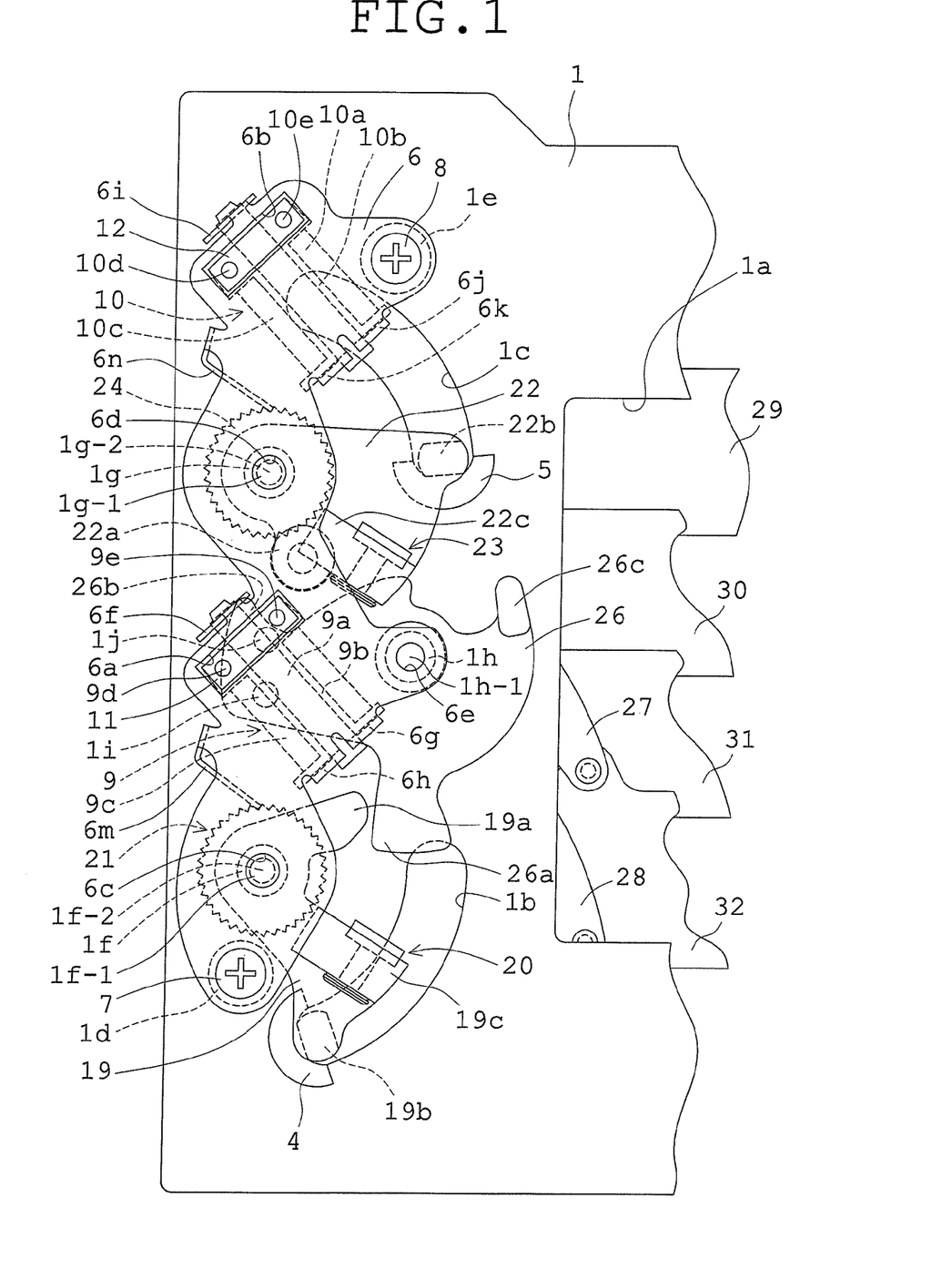
FIG. 1 is a plane view showing the approximately left half of a focal plane shutter of an embodiment and showing a state of the focal plane shutter just after a second blade finishes operating in shooting.
Figure 2:
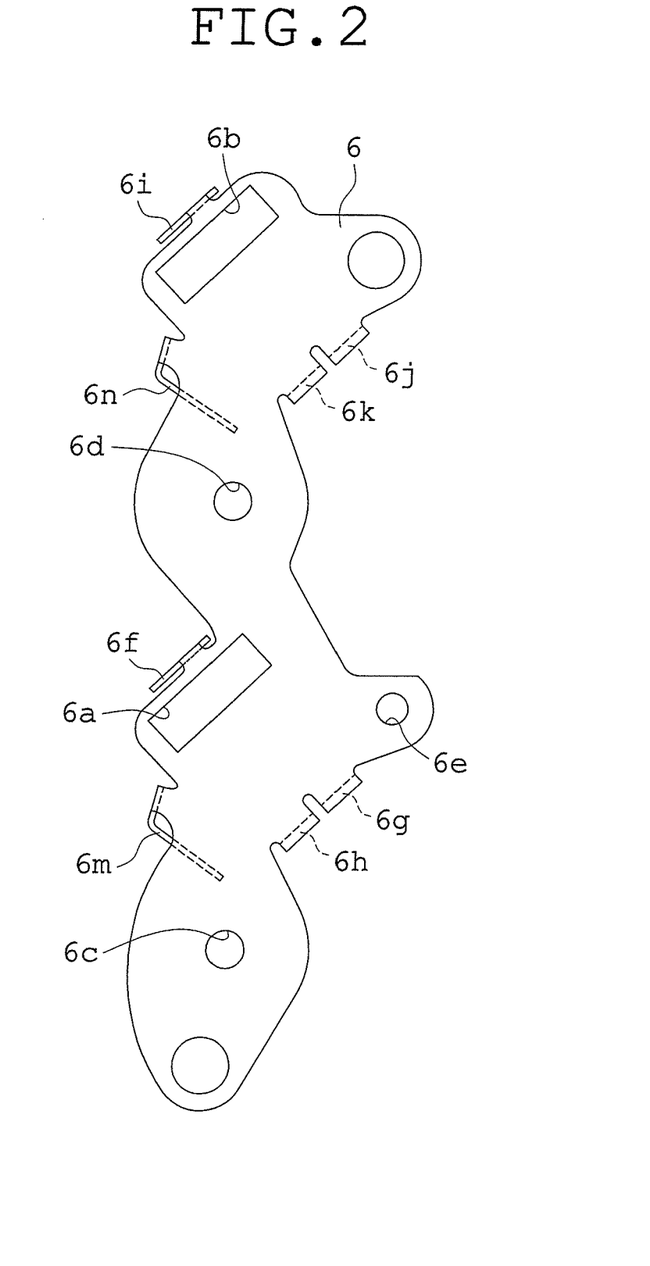
FIG. 2 is a plane view showing the shape of a support plate shown in FIG. 1.
Figure 3:
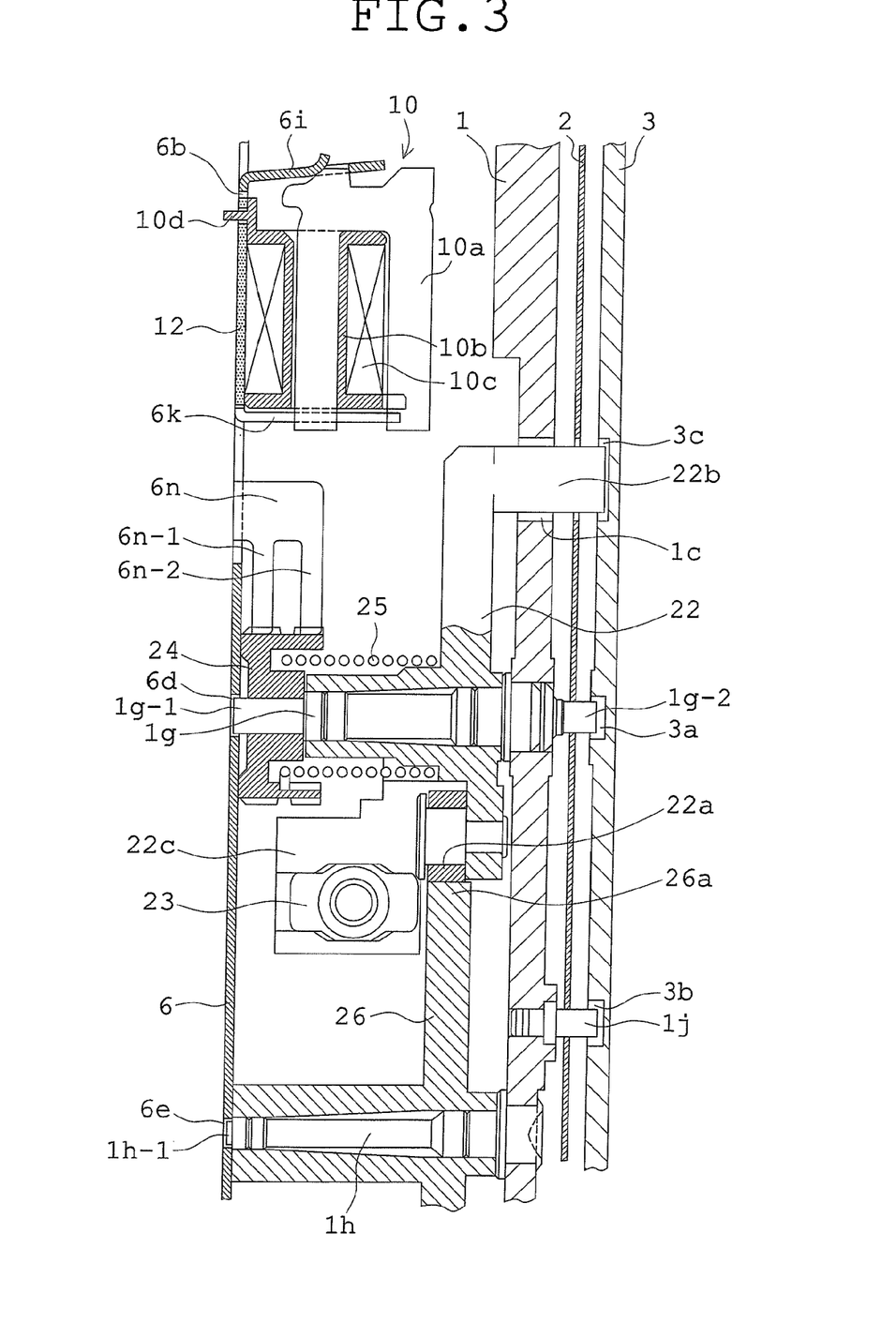
FIG. 3 is a side view showing only a primary part of the focal plane shutter when the focal plane shutter is viewed from the right side of FIG. 1 in order to easily understand the relation between components overlapping with one another, and showing the cross sections of parts which are regarded as necessary.
Figure 4:
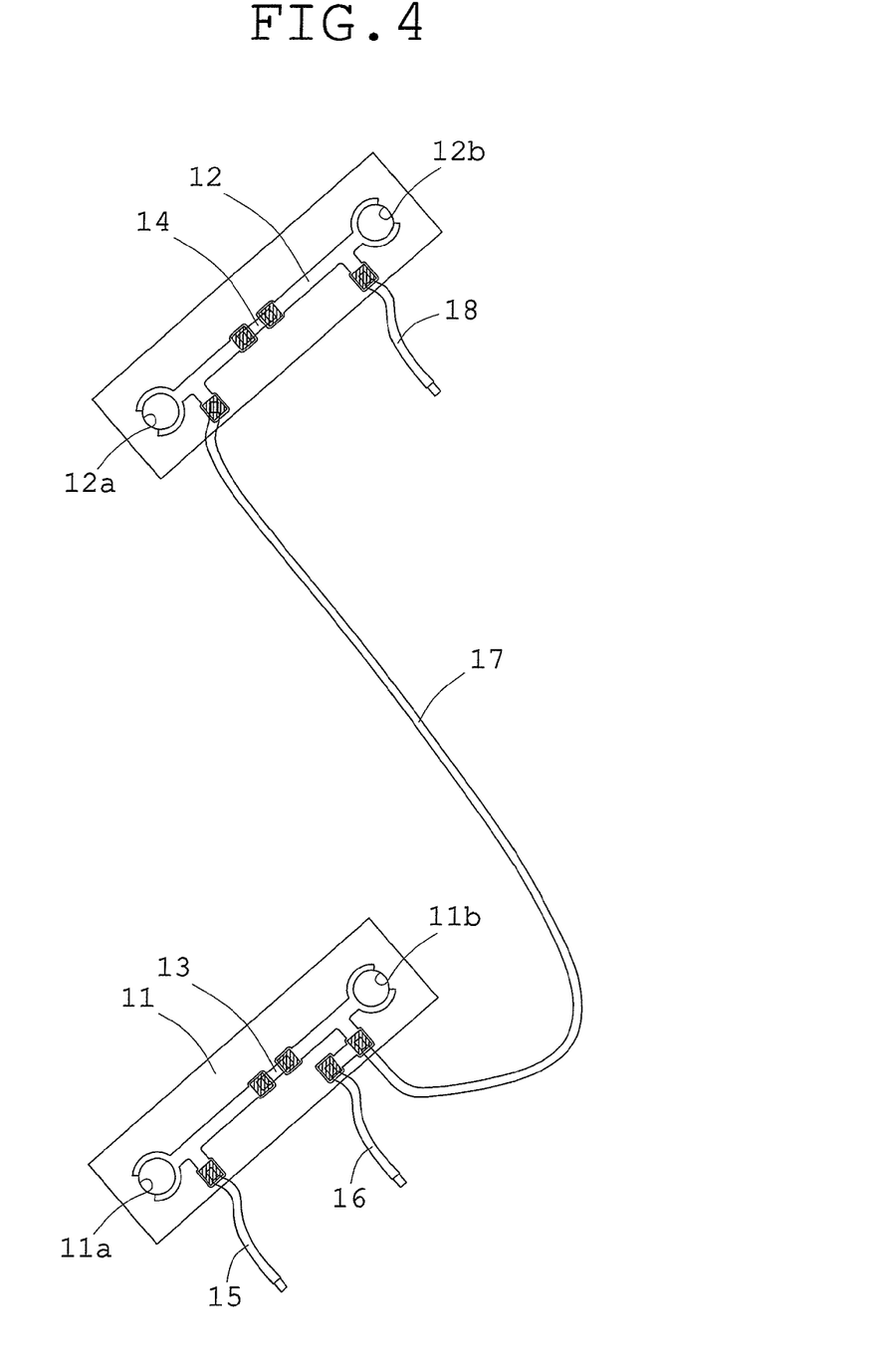
FIG. 4 is a view showing two printed wiring boards shown in FIG. 1 in detail and showing the relation between the printed wiring boards connected with each other.

And, FIG. 1 used for the explanation about the present embodiment is a plane view showing the approximately left half of the focal plane shutter of the present embodiment when the focal plane shutter is built into a camera and viewed from the taking-lens side. FIG. 1 shows a state of the focal plane shutter just after a second blade finishes operating in shooting. Also, FIG. 2 is a plane view showing the shape of a support plate shown in FIG. 1. Also, FIG. 3 is a side view showing only a primary part of the focal plane shutter when the focal plane shutter is viewed from the right side of FIG. 1 in order to easily understand the relation between components shown in FIG. 1 that overlap with one another, and showing the cross sections of parts which are regarded as necessary. In addition, FIG. 4 is a view showing two printed wiring boards shown in FIG. 1 in detail and showing the relation between the printed wiring boards connected with each other.

Besides, in the explanation about the present embodiment, the present embodiment presumes that a taking lens is placed on the front side of FIG. 1 when the focal plane shutter of the present embodiment is built into a camera, as described above. However, a taking lens may be placed on the back side of FIG. 1 when the focal plane shutter of the present embodiment is built into a digital camera, as known publically.

Now, a structure of the focal plane shutter according to the present embodiment is first explained. In FIG. 1, an opening 1a which is shaped like an oblong rectangle is formed in the approximate middle of a shutter base plate 1 made of synthetic resin, in order to restrict an exposure aperture. However, because FIG. 1 shows only less than left half of the focal plane shutter when the focal plane shutter is viewed from the taking-lens side, only a part of the left side portion of the opening 1a is shown in FIG. 1.

As seen from FIG. 3, a middle plate 2 and an auxiliary plate 3 are placed on the rear side of the shutter base plate 1 in turn at predetermined intervals, a blade room for second blade is formed between the shutter base plate 1 and the middle plate 2, and a blade room for first blade is formed between the middle plate 2 and the auxiliary plate 3. Also, an opening the shape of which is similar to the shape of the opening 1a and which is somewhat larger than the opening 1a is formed on each of areas of the middle plate 2 and the auxiliary plate 3, these areas of the middle plate 2 and the auxiliary plate 3 overlapping with the opening 1a, but these openings which are formed on the middle plate 2 and the auxiliary plate 3 respectively are not shown in the drawings because such a matter is publically known.

In FIGS. 1 and 2, two arc-shaped elongate holes 1b and 1c are formed on the left side of the opening 1a. And, publically-known buffer members 4 and 5 the plane shapes of which are shaped like the letter, "C" are fitted to the lower ends of the elongate holes 1b and 1c respectively. In addition, two pillars 1d and 1e are erectly provided at positions near to the elongate holes 1b and 1c on the shutter base plate 1 respectively. And, a support plate 6 which is one metal plate is fitted on the planes of the top ends of the pillars 1d and 1e through screws 7 and 8, with a plate plane of the support plate 6 parallel to the shutter base plate 1.

Not only two relatively large rectangle-shaped holes 6a and 6b but also a plurality of circle-shaped holes and a plurality of bending parts are formed on the support plate 6, and these parts would be understood in turn by the following explanation. Besides, the two rectangle-shaped holes 6a and 6b correspond to a missing portion of the present invention. However, missing portions for the present invention are not limited to such holes. A part of the hole 6a or 6b may be formed to be a cutout that is open to the outer edge of the support plate 6 like a bay. Also, even in the case where a missing portion for the present invention is formed as a hole, the shape of the missing portion is not limited to rectangular shapes.

Shafts 1f and 1g are erectly provided on the shutter base plate 1. These shafts 1f and 1g are made of metal and are inserted into holes formed on the shutter base plate 1 in a press-fit manner, respectively, as seen from the shaft 1g shown in FIG. 3. Small diameter portions 1f-1 and 1g-1 are provided on the support plate 6-side ends of the shafts 1f and 1g respectively, and shaft portions 1f-2 and 1g-2 which protrude toward the auxiliary base plate 3 are provided on the other side ends of the shafts 1f and 1g respectively. And, the top ends of the small diameter portions 1f-1 and 1g-1 are inserted into circle-shaped holes 6c and 6d respectively, the circle-shaped holes 6c and 6d being formed in the support plate 6. Also, the top ends of the shaft portions 1f-2 and 1g-2 are inserted into holes which are formed in and do not penetrate the auxiliary base plate 3 made of synthetic resin, respectively, and a hole 3a of these holes into which the shaft portion 1g-2 is inserted is shown in FIG. 3.

Also, a shaft 1h is erectly provided on the support-plate-6 side plane of the shutter base plate 1. This shaft 1h is made of metal and is fixed to the shutter base plate 1 with caulking process, as shown in FIG. 3. A small diameter portion 1h-1 on the top end of the shaft 1h is inserted into a circle-shaped hole 6e of the support plate 6. In addition, shafts 1i and 1j are erectly provided on the auxiliary-base-plate-3 side plane of the shutter base plate 1. These shafts 1i and 1j are made of metal and are inserted into holes formed in the shutter base plate 1 in a press-fit manner, respectively, as seen from the shaft 1j shown in FIG. 3. And, the top ends of the shafts 1i and 1j are inserted into holes which are formed in and do not penetrate the auxiliary base plate 3, respectively, and an hole 3b of these holes into which the shaft 1j is inserted is shown in FIG. 3.

Bending parts 6f, 6g, and 6h which are formed on the support plate 6 are used for fitting an electromagnet 9 for first blade through the elasticity of these bending parts 6f, 6g, and 6h, and bending parts 6i, 6j, and 6k which are formed on the support plate 6 are used for fitting an electromagnet 10 for second blade through the elasticity of these bending parts 6i, 6j, and 6k. Because a structure for fitting these electromagnets is publically known, a detailed explanation about the structure for fitting these electromagnets is omitted. Also, these two electromagnets 9 and 10 are composed of iron core members 9a and 10a, bobbins 9b and 10b, and coils 9c and 10c respectively.

And, the both ends of the coil 9c are wounded around two terminal pins 9d and 9e respectively, the two terminal pins 9d and 9e being formed intgratedly with the bobbin 9b of the electromagnets 9 for first blade. And, the two terminal pins 9d and 9e penetrate through the rectangle-shaped hole 6a formed in the support plate 6 and protrude toward the taking-lens side. Also, the both ends of the coil 10c are wounded around two terminal pins 10d and 10e respectively, the two terminal pins 10d and 10e being formed intgratedly with the bobbin 10b of the electromagnets 10 for second blade. And, the two terminal pins 10d and 10e penetrate through the rectangle-shaped hole 6b formed in the support plate 6 and protrude toward the taking-lens side.

Also, bending parts 6m and 6n which are formed on the support plate 6 are formed as a ratchet pawl having elasticity to be used for stopping a rotation of a ratchet member 21 and a rotation of a ratchet member 24 respectively, the ratchet members 21 and 24 being explained below. Each of the bending parts 6m and 6n includes two pawls, and two pawls 6n-1 and 6n-2 of these pawls, which are formed on the bending part 6n, are shown in FIG. 3.

Rectangle-shaped printed wiring boards 11 and 12 which are much smaller than the rectangle-shaped holes 6a and 6b are placed in the rectangle-shaped holes 6a and 6b formed in the support plate 6, respectively. In the present embodiment, these printed wiring boards 11 and 12 are flexible printed wiring boards and have approximately the same thickness as the support plate 6 does, as seen from the printed wiring board 12 shown in FIG. 3. As a result, a structure of the focal plane shutter according to the present embodiment becomes thinner than conventional structures in which a printed wiring board is put on a support plate, by the thicknesses of the printed wiring boards 11 and 12, so that the distance from the shutter base plate 1 to the taking-lens side plane of the support plate 6 becomes short.

Besides, although the printed wiring boards 11 and 12 for the present embodiment are flexible printed wiring boards, printed wiring boards used for the present invention are not limited to flexible printed wiring boards, and hard printed wiring boards may be used in the present invention. When a hard printed wiring board is used in the present embodiment, the thickness of the hard printed wiring board may be thicker than that of the support plate 6. However, even in such a case, a structure of the focal plane shutter as a whole in this case becomes thinner than conventional structures in which a printed wiring board is put on a support plate, by the thicknesses of the printed wiring boards 11 and 12 and by the thickness of the support plate 6 regionally, so that the distance from the shutter base plate 1 to the taking-lens side plane of the support plate 6 becomes short.

FIG. 1 merely shows the outer shapes of the printed wiring boards 11 and 12. Accordingly, structures of the printed wiring board 11 and 12 for the present embodiment including wiring structures are explained in detail using FIG. 4. Two circle-shaped holes 11a and 11b through which the two terminal pins 9d and 9e are made to penetrate respectively are formed in the printed wiring board 11 while the holes 11a and 11b are located in the vicinities of the both ends of the printed wiring board 11 in the longitudinal direction respectively. Two circle-shaped holes 12a and 12b through which the two terminal pins 10d and 10e are made to penetrate respectively are formed in the printed wiring board 12 while the holes 12a and 12b are located in the vicinities of the both ends of the printed wiring board 12 in the longitudinal direction respectively. And, straight wiring patterns are formed on the printed wiring boards 11 and 12 respectively, these straight wiring patterns being divided in the approximately middle positions between the holes 11a and 11b and between the holes 12a and 12b respectively. Condensers 13 and 14 which are chip parts are placed at the positions at which the straight wiring patterns are divided, respectively. And, the condenser 13 is soldered to the both divided wiring patterns which are formed on the printed wiring board 11, and the condenser 14 is soldered to the both divided wiring patterns which are formed on the printed wiring board 12.

And, in the printed wiring board 11, a lead wire 15 which is connected to the anode of a power supply is soldered to a wiring pattern branching from the portion of the wiring pattern between the hole 11a and the condenser 13. In addition, a lead wire 16 which is connected to the cathode of the power supply and a lead wire 17 which connects the printed wiring board 11 with the printed wiring board 12 are soldered to a wiring pattern branching from the portion of the wiring pattern between the hole 11b and the condenser 13. On the other hand, in the printed wiring board 12, the lead wire 17 is soldered to a wiring pattern branching from the portion of the wiring pattern between the hole 12a and the condenser 14, and a lead wire 18 which is connected to the anode of the power supply is soldered to a wiring pattern branching from the portion of the wiring pattern between the hole 12b and the condenser 14.

And, in the printed wiring boards 11 and 12, after the lead wires 15, 16, 17, and 18 are connected to the wiring patterns respectively, the terminal pins 9d, 9e, 10d, and 10e are fitted into the holes 11a, 11b, 12a, and 12b respectively, as shown in FIG. 4. And then, these portions at which these terminal pins are fitted into these holes respectively are soldered. And, the lead wires 15, 16, and 17 are guided from a gap in the hole 6a of the support plate 6 to the shutter-base-plate-1 side. The lead wires 17 and 18 are guided from a gap in the hole 6b of the support plate 6 to the shutter-base-plate-1 side. As a result, the condenser 13 and the coil 9c of the electromagnet 9 are to be connected in parallel and the condenser 14 and the coil 10c of the electromagnet 10 are to be connected in parallel.

Besides, the reason why the condensers 13 and 14 are connected in such a manner is that back electromotive force occurring in cutting off the supply of electric current to the coils 9c and 10c of the electromagnets 9 and 10 is absorbed in the below-explained operation of the focal plane shutter in shooting so that timing with which each of the shutter blades starts running can be stably obtained and that an electronic circuit not shown in the drawings is not damaged or its endurance is not deteriorated by back electromotive force, as known publically. Also, in the present embodiment, the printed wiring boards 11 and 12 are equipped with only the condensers 13 and 14 respectively. However, the present invention is not limited to such a structure, and the printed wiring boards 11 and 12 may be equipped with other electronic components by changing a wiring pattern.

Also, in the present embodiment, the lead wires 15, 16, 17, and 18 are made as members different from the printed wiring boards 11 and 12. However, the lead wires 15, 16, 17, and 18 together with the printed wiring boards 11 and 12 of the present embodiment may constitute one flexible printed wiring board in the present, and portions of the one flexible printed wiring board except its portions placed in the rectangle-shaped holes 6a and 6b may be guided from gaps in the holes 6a and 6b to the shutter-base-plate-1 side, respectively. And, in the case where a focal plane shutter according to the present invention is formed in such a manner, the condensers 13 and 14 of the present embodiment may be placed on the portions of the one flexible printed wiring board which are guided to the shutter-base-plate-1 side, respectively.

Next, members fitted to the shafts 1f, 1g, and 1h on the support-plate-6 side of the shutter base plate 1 respectively are explained in turn. First, a first blade-driving member 19 is rotatably fitted to the shaft 1f. The first blade-driving member 19 is made of synthetic resin and includes a portion 19a to be pushed, a driving pin 19b, and a fitting portion 19c.

Among these portions, the driving pin 19b which is erectly provided on the shutter-base-plate-1 side of the first blade-driving member 19 has an oval cross section and penetrates through the elongate hole 1b of the shutter base plate 1, and the top end of the driving pin 19b is inserted into an arc-shaped elongate hole of the auxiliary base plate 3 not shown in the drawings (and having approximately the same shape as the elongate hole 1b does). And, the focal plane shutter of the present embodiment is formed in such a way that: the base-side portion of the driving pin 19b meets the buffer member 4; and the top end-side portion of the driving pin 19b is connected with a first blade in the blade room, as explained below. Also, an iron piece member 20 is fitted in the fitting portion 19c which is formed on the support-plate-6 side to be thick while a compressing spring not shown in the drawings is standing between the iron piece member 20 and the fitting portion 19c. Because the specific structure for fitting the iron piece member 20 in the fitting portion 19c is publically known and is not directly related to the present invention, a detailed explanation about this matter is omitted.

Not only such a first blade-driving member 19 but also the ratchet member 21 is rotatably fitted to the shaft 1f, and the ratchet member 21 is rotatably fitted to the small diameter portion 1f-1 formed on the top end of the shaft 1f. Ratchet teeth which are formed on the circumference surface of the ratchet member 21 engage with the bending part 6m formed on the support plate 6. In addition, a publically known first blade-driving spring which is not shown in the drawings is provided between the ratchet member 21 and the first blade-driving member 19 to connect the ratchet member 21 with the first blade-driving member 19. However, the configuration for these ratchet member 21 and first blade-driving spring not shown in the drawings is substantially equal to that for a ratchet member 24 and a second blade-driving spring 25 which are explained below using FIG. 3. Accordingly, the explanation about the configuration for the ratchet member 24 and the second blade-driving spring 25 makes it possible to understand the configuration for the ratchet member 21 and the first blade-driving spring not shown in the drawings, so that the explanation about the configuration for the ratchet member 21 and the first blade-driving spring is omitted.

A second blade-driving member 22 is rotatably fitted to the shaft 1g of the shutter base plate 1. The second blade-driving member 22 as well as the first blade-driving member 19 is made of synthetic resin. A roller 22a as a portion to be pushed is fitted to the second blade-driving member 22. In addition, the second blade-driving member 22 includes a driving pin 22b and a fitting portion 22c.

Among these portions, the driving pin 22b which is erectly provided on the shutter-base-plate-1 side has an oval cross section and penetrates through the elongate hole 1c of the shutter base plate 1. And, the top end of the driving pin 22b is inserted into an arc-shaped elongate hole 3c of the auxiliary base plate 3 (refer to FIG. 3). And, the focal plane shutter of the present embodiment is formed in such a way that: the base-side portion of the driving pin 22b meets the buffer member 5; and the top end-side portion of the driving pin 22b is connected with a second blade in the blade room, as explained below. Also, an iron piece member 23 is fitted in the fitting portion 22c which is formed on the support-plate-6 side to be thick while a compressing spring not shown in the drawings is standing between the iron piece member 23 and the fitting portion 22c. Because the specific structure for fitting the iron piece member 23 in the fitting portion 22c is equal to that for the iron piece member 20 and is known publically, a detailed explanation about this matter is omitted.

Not only the second blade-driving member 22 having such a structure but also the ratchet member 24 is rotatably fitted to the shaft 1g, and the ratchet member 24 is rotatably fitted to the small diameter portion 1g-1 formed on the top end of the shaft 1g. And, as seen from FIG. 3 showing its cross section, two rows of ratchet teeth are provided on the circumference surface of the ratchet member 24, the first row of ratchet teeth which is provided on the support-plate-6 side engages with the pawl 6n-1 of the bending part 6n, and the second row of ratchet teeth which is provided on the shutter-base-plate-1 side engages with the pawl 6n-2 of the bending part 6n. The second row of ratchet teeth is shifted relative to the first row of ratchet teeth by half a pitch, so that the pawls 6n-1 and 6n-2 alternately engage with the first-row ratchet teeth and the second-row ratchet teeth respectively.

Also, as shown in FIG. 3, the publically known second blade-driving spring 25 is provided between the ratchet member 24 and the second blade-driving member 22 to connect the ratchet member 24 with the second blade-driving member 22.

In FIG. 1, the ratchet member 24 is biased to be rotated in the counterclockwise direction, and the second blade-driving member 22 is biased to be rotated in the clockwise direction. However, because the ratchet member 24 is rotated when the biasing force of the second blade-driving spring 25 is adjusted in manufacturing focal plane shutters, ratchet teeth in one of the two rows of ratchet teeth always engage with one of the two pawls 6n-1 and 6n-2 in using camera and the ratchet member 24 is not rotated.

A cocking member 26 which is made of synthetic resin is rotatably fitted to the shaft 1h of the shutter base plate 1. The cocking member 26 is biased to be rotated in the counterclockwise direction in FIG. 1 by the biasing force of a return spring not shown in the drawings. FIG. 1 shows a state of the focal plane shutter in which a stopper not shown in the drawings prevents the cocking member 26 from rotating in the counterclockwise direction. Accordingly, in the following explanation about operation of the focal plane shutter of the present embodiment, this position of the cocking member 26 shown in FIG. 1 is called "initial position". And, the cocking member 26 includes pushing portions 26a and 26b and a portion 26c to be pushed. When the cocking member 26 is rotated in the clockwise direction in FIG. 1, the pushing portion 26a pushes the portion 19a to be pushed of the first blade-driving member 19, and the pushing portion 26b pushes the roller 22a of the second blade-driving member 22.

Finally, the first and second blades which are placed in the blade rooms respectively are explained. The first and second blades for the present embodiment have completely the same structure, as known publically from Japanese Patent KOKAI No. 2002-148679 or the like for example. And, the first and second blades are fitted to the shutter base plate 1 while the first blade is reversed relative to the second blade. And, if the whole structures of the first and second blades are shown in FIG. 1, FIG. 1 is very hard to view. In addition, the structures of the first and second blades themselves are not directly related to the present invention. Accordingly, the first blade is omitted in FIG. 1, and only an area of the second blade which can be viewed from the opening 1a is shown in FIG. 1. Now, the structures of the first and second blades are explained by starting with the explanation about the structure of the second blade, using FIG. 1.

The second blade for the present embodiment is composed of: an arm 27 one end of which is rotatably fitted to the shaft portion 1g-2 of the shaft 1g; an arm 28 one end of which is rotatably fitted to the shaft 1j; and four blade portions 29, 30, 31, and 32 which are pivotably supported by both of the arms 27 and 28 toward the top ends of the arms 27 and 28 in turn. And, the two arms 27 and 28 are placed nearer to the shutter base plate 1 than the four blade portions 29, 30, 31, and 32 are placed. Also, the driving pin 22b of the second blade-driving member 22 is fitted into a publically-known hole which is provided for the arm 27 and not shown in the drawings. As a result, when the second blade-driving member 22 is rotated in the counterclockwise direction from the state of the second blade-driving member 22 shown in FIG. 1, the second blade moves to an area above the opening 1a while an amount of overlap between the four blade portions 29, 30, 31, and 32 is increasing. And then, the second blade is stored above the opening 1a with the second blade folded.

On the other hand, although the structure of the first blade not shown in the drawings is completely the same as that of the second blade, the first blade is reversed relative to the second blade, that is to say, the first blade is made to rotate 180 degrees on a vertical axis in FIG. 1 so that the two arms of the first blade are located nearer to the auxiliary base plate 3 than the four blade portions of the first blade are located, and then one ends of the two arms of the first blade are rotatably fitted to the shaft portion 1f-2 of the shaft 1f and the shaft 11 respectively. Also, the driving pin 19b of the first blade-driving member 19 is fitted into a publically-known hole which is provided for the arm fitted to the shaft portion 1f-2. And, the first blade not shown in the drawings is stored below the opening 1a with the four blade portions of the first blade overlapping with one another, in FIG. 1. However, when the first blade-driving member 19 is rotated in the counterclockwise direction from the state of the first blade-driving member 19 shown in FIG. 1, the first blade moves upward while an amount of overlap between the four blade portions of the first blade is decreasing. And then, the first blade is unfolded to cover the opening 1a.

Next, operation of the focal plane shutter of the present embodiment formed in such a manner is explained. FIG. 1 shows a state of the focal plane shutter just after operation of the focal plane shutter in exposure is finished. Accordingly, the first blade-driving member 19 is rotated in the clockwise direction by the biasing force of the first blade-driving spring not shown in the drawings, and then the driving pin 19b meets the buffer member 4 to keep the first blade-driving member 19 stopping. And, in this case, the four blade portions of the first blade not shown in the drawings are folded with the maximum amount of overlap between the four blade portions of the first blade and are stored below the opening 1a. On the other hand, the second blade-driving member 22 is rotated in the clockwise direction by the biasing force of the second blade-driving spring 25, and then the driving pin 22b meets the buffer member 5 to keep the second blade-driving member 22 stopping. And, the four blade portions 29, 30, 31, and 32 of the second blade are unfolded with the minimum amount of overlap between the four blade portions 29, 30, 31, and 32 and cover the opening 1a.

Cocking operation of the focal plane shutter of the present embodiment for cocking the focal plane shutter starts in the state of the focal plane shutter shown in FIG. 1. A camera body-side member not shown in the drawings pushes the portion 26c to be pushed of the cocking member 26 to rotate the cocking member 26 in the clockwise direction against the biasing force of the return spring not shown in the drawings, so that the cocking operation of the focal plane shutter starts. And, in the cocking operation, the pushing portion 26a of the cocking member 26 first pushes the portions 19a to be pushed of the first blade-driving member 19, so that the first blade-driving member 19 is rotated in the counterclockwise direction against the biasing force of the first blade-driving spring not shown in the drawings. As a result, the four blade portions of the first blade not shown in the drawings move upward while an amount of overlap between the four blade portions of the first blade is decreasing.

And, when a slit-forming blade portion of the four blade portions of the first blade which is pivotably supported nearest to the top ends of the two arms of the first blade overlaps with the blade portion 32 that is a slit-forming blade portion of the second blade, by a predetermined amount, the pushing portion 26b of the coking member 26 starts pushing the roller 22a to rotate the second blade-driving member 22 in the counterclockwise direction against the biasing force of the second blade-driving spring 25. As a result, the driving pin 22b of the second blade-driving member 22 rotates the arm 27 in the counterclockwise direction, so that the four blade portions 29, 30, 31, and 32 of the second blade together with the four blade portions of the first blade move upward while an amount of overlap between the four blade portions 29, 30, 31, and 32 of the second blade is increasing, the first blade being not shown in the drawings.

When the first blade-driving member 19 and the second blade-driving member 22 are rotated in the counterclockwise direction together, the four blade portions 29, 30, 31, and 32 of the second blade move away to the area above the opening 1a, and the four blade portions of the first blade not shown in the drawings completely cover the opening 1a, in such a manner, the iron piece members 20 and 23 which are fitted to the two driving members 19 and 22 respectively touch the iron core members 9a and 10a of the two electromagnets 9 and 10 respectively just after that. And, the coking member 26 is made to stop rotating at that stage, does not return to its initial position until next shooting is performed, and is kept in this state. This state of the focal plane shutter is a cocking operation-completion state, or a next shooting-standby state. At this point of time, the four blade portions 29, 30, 31, and 32 of the second blade are stored above the opening 1a with the four blade portions 32, 30, 31, and 32 folded, and the four blade portions of the first blade not shown in the drawings are unfolded to cover the opening 1a.

When a release button of a camera is pushed in next shooting, electric current is first supplied to the coils 9c and 10c of the two electromagnets 9 and 10 through the lead wires 15, 16, 17, and 18, so that the iron core members 9a and 10a attract and hold the iron piece members 20 and 23 respectively. Next, the camera body-side member not shown in the drawings moves away from the portion 26c to be pushed of the cocking member 26, so that the cocking member 26 is rotated in the counterclockwise direction by the biasing force of the return spring not shown in the drawings and returns to its initial position.

Afterward, the supply of electric current to the coil 9c of the electromagnet 9 for first blade is first cut off, and then the supply of electric current to the coil 10c of the electromagnet 10 for second blade is cut off after a predetermined lapse of time. As a result, the first blade-driving member 19 and the second blade-driving member 22 are quickly rotated in the clockwise direction by the biasing force of the first blade-driving spring not shown in the drawings and by the biasing force of the second blade-driving spring 25 respectively, in succession. As a result, the driving pins 19b and 22b rotate the arms of the first and second blades in the clockwise direction respectively, so that an image-forming plane is exposed by a slit which is formed by the slit-forming blade portion of the first blade and the slit-forming blade portion 32 of the second blade, the first blade being not shown in the drawings. In this process, an amount of overlap between the four blade portions of the first blade increases, and an amount of overlap between the four blade portions of the second blade decreases.

And, the driving pin 19b meets the buffer member 4 just after the four blade portions of the first blade not shown in the drawings move away from the lower edge of the opening 1a downward, so that the first blade-driving member 19 having started its exposure operation on ahead is stopped. On the other hand, the driving pin 22b meets the buffer member 5 just after the lower edge of the slit-forming blade portion 32 of the second blade reaches more downward than the lower edge of the opening 1a, so that the second blade-driving member 22 having started its exposure operation later than the first blade-driving member 19 is stopped. As a result, the four blade portions of the first blade not shown in the drawings are folded below opening 1a, and the four blade portions 29, 30, 31, and 32 of the second blade are unfolded to cover the opening 1a.

FIG. 1 shows the state of the focal plane shutter in which the exposure operation of the focal plane shutter is finished in such a manner. However, in the case where the focal plane shutter of the present embodiment is used for digital cameras, shooting is finished by writing in a storage data on charges stored on an imaging sensor by the exposure operation as image information thereafter. Accordingly, the above described cocking operation has to be performed afterward.

Besides, although the focal plane shutter of the present embodiment is formed as a direct-type focal plane shutter including two shutter blades, the present invention is not limited to such a structure. Focal plane shutters according to the present invention may be formed as a direct-type focal plane shutter including a single shutter blade. Such a structure can be obtained by removing members such as the electromagnet 9 for first blade, the printed wiring board 11, the first blade-driving member 19, the ratchet member 21, the first blade-driving spring not shown in the drawings, and the first blade not shown in the drawings, which are used only for the first blade system in the present embodiment, and by changing part of the shape of the shutter base plate 1, the support plate 6, or the like at the same time, for example. And, focal plane shutters formed in such a manner are applicable only to digital cameras, as known publically.

What is claimed is:

1. A focal plane shutter for cameras comprising
a support plate which has a missing portion and is placed while a plate plane of the support plate is parallel to a shutter base plate,
a driving member which is rotatably fitted to a shaft erectly provided on the shutter base plate, between the shutter base plate and the support plate, and which is rotated by biasing force of a driving spring from its shooting-operation-starting position in shooting to run a shutter blade,
an electromagnet which includes a coil wounded around a bobbin, the both ends of the coil being wound around two terminal pins that are provided for the bobbin and are inserted into the missing portion, respectively, and an iron core member magnetized by electrifying the coil, which is fitted on the support plate with the electromagnet between the shutter base plate and the support plate, and which attracts and holds the driving member by magnetization of the iron core member in shooting and then releases the driving member to make it possible to rotate the driving member from its shooting-operation-starting position by demagnetization of the iron core member after a predetermined lapse of time, and
a printed wiring board which is placed in the missing portion and is soldered to the both ends of the coil.

2. A focal plane shutter for cameras according to claim 1, wherein the focal plane shutter comprises two driving members, two electromagnets, and two printed wiring boards, the support plate is provided with two missing portions, and the two printed wiring boards are electrically connected to each other.

* * * * *